Aug. 27, 1968  B. L. BEVIS  3,398,781
EJECTION MECHANISM FOR MOLDING APPARATUS
Filed May 2, 1966
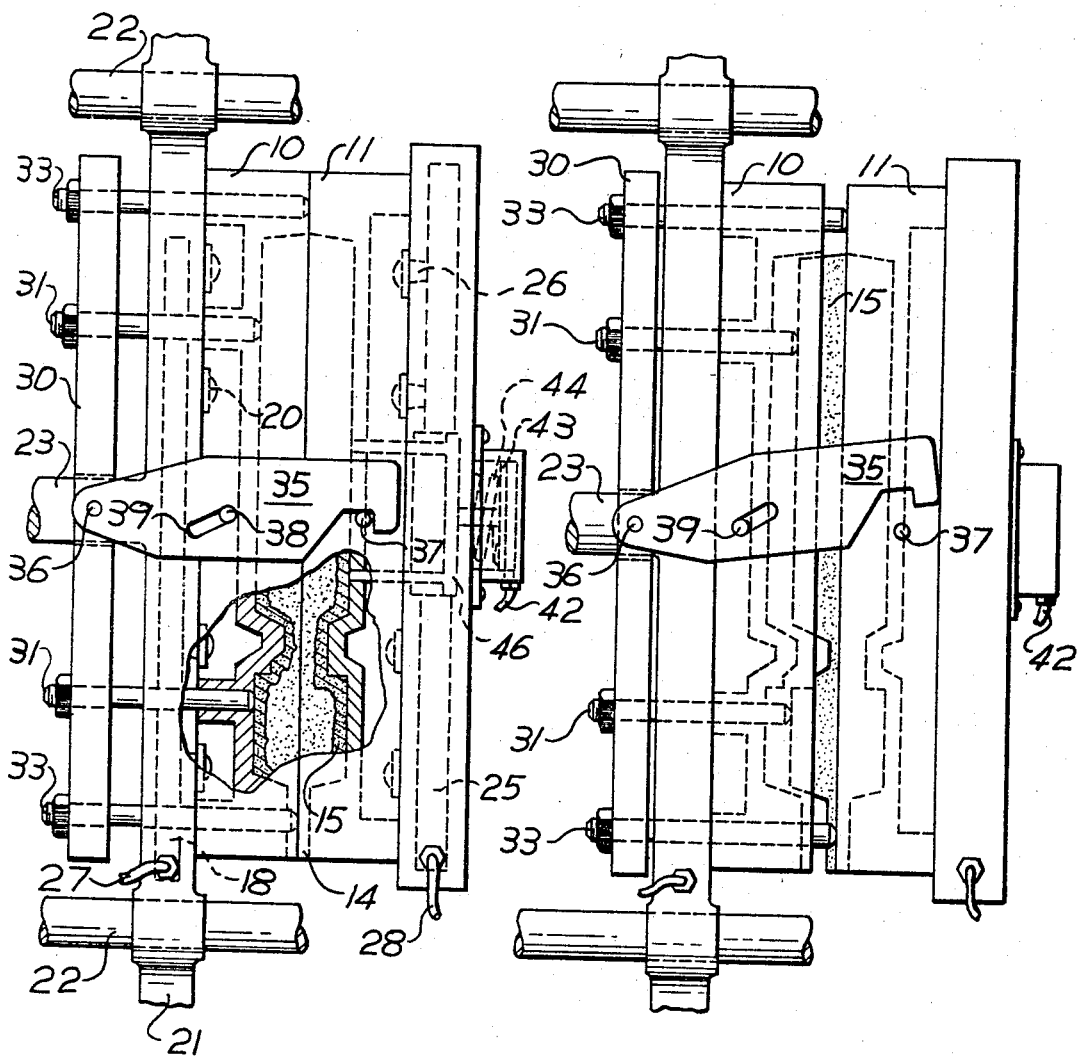
INVENTOR.
BURTON L. BEVIS
BY
ATTORNEYS

United States Patent Office 3,398,781
Patented Aug. 27, 1968

3,398,781
EJECTION MECHANISM FOR MOLDING
APPARATUS
Burton L. Bevis, Peoria, Ill., assignor to Caterpillar Tractor Co., Peoria, Ill., a corporation of California
Filed May 2, 1966, Ser. No. 546,961
2 Claims. (Cl. 164—228)

ABSTRACT OF THE DISCLOSURE

Means to manufacture shell molds for foundry use which are made in core boxes and particularly means for insuring proper removal of cured shell molds upon separation of the core boxes in which they are made.

---

Shell molds are made in core boxes to which heat is applied for curing the mold of resin coated sand. The core boxes are formed of separable parts and have cavities into which the resin coated sand can be sprayed. After heat is applied and the mold is cured, the core box parts are separated and the molds removed. The molds are fragile and are often broken during separation of the core box parts.

It is the object of the present invention to provide improved stripper pin mechanism which serves positively to strip the mold from one-half of the core box instantly upon separation of the halves and therefore insure against breakage of the mold which will be retained in entirety in the other half of the core box. Means are also provided for stripping the mold from the other half of the core box.

The manner in which the above object is accomplished and other specific objects and advantages of the invention are made apparent in the following specification wherein reference is made to the accompanying drawing.

In the drawing:

FIG. 1 is a view in side elevation with parts in section showing the core box assembly of a shell mold making machine; and FIG. 2 is a similar elevation with the core box parts separated.

Referring to FIG. 1, a core box is shown as made of two separable halves 10 and 11. When brought together in the position shown in FIG. 1 they have recesses which form a cavity for the reception of resin coated sand which is blown into the cavity through openings such as indicated at 14 in the bottom of the box and heated to cure and render solid a layer of sand in contact with the walls of the cavity. When this condition has been attained, the remaining sand is permitted to drain out of the cavity through the opening 14 leaving a hollow shell mold such as represented in section at 15. A heater comprising a manifold 18 and nozzles such as shown at 20 is contained in a sliding support 21 for the core box part 10. This support is slidable on rails 22 and actuated by a hydraulic or pneumatic cylinder (not shown) through a connecting rod, a part of which is illustrated at 23. A similar heater which includes a manifold 25 and nozzles 26 heats the core box half 11, gas being supplied to these heaters by conduits partially shown at 27 and 28. Electric heaters may also be used for this purpose.

An ejector plate shown at 30 carries numerous stripper pins, two of which are indicated at 31 as extending through suitable bores in the heater and core box half 10 to the inner surface of the cavity which contains the mold. The function of these pins is to insure ejection of the shell mold from the cavity in the part 10 when it is retracted from the core box part 11 as well as to hold the mold in the part 11. Other pins shown at 33 extend through the part 10 and engage the surface of the part 11 to insure precise positioning of the pins 31. Retraction of the core box part 10 is accomplished by movement toward the left, as viewed in the drawing, of the rod 23 causing sliding of the housing of heater 21 on the rods 22 and movement of the part 10 which is secured to the heater toward the separated position shown in FIG. 2. The plate 30 and stripper pins 31 carried thereby are momentarily held against movement with the part 10 by a latch shown at 35 as pivoted to the plate 30 at 36 and having latching engagement with a pin 37 on the core box half 11. This may be one of a pair of latches disposed on opposite sides of the core box which are identical and operate in unison. The latch is released by a pin 38 in an inclined cam slot 39. However initial leftward movement of the part 10 raises the latch only slightly so that it is still in latching engagement with the pin 37. Thus the stripper pins 31 are held against leftward movement and in effect are advanced into the cavity ejecting the mold therefrom. When the shell mold is completely free of the part 10, as shown in FIG. 2, the latch 35 will be fully raised and further retraction also retracts the plate 30 and stripper pins 31. When they are sufficiently spaced from the half core box 11, other stripper pins shown at 40 in FIG. 1 may be advanced to eject the shell mold from this part of the box. These pins are conventional and may be actuated by air introduced through a conduit 42 to advance a piston 43 against the bias of a spring 44. This piston is connected by a rod to a plate 46 which carries the pins 40.

In some types of machines, the core box part 11 and heater housing upon which it is mounted are hinged to swing away after the core box parts are separated to make the core more readily accessible for final ejection. These and other parts of the machine are however not disclosed as it is to the stripper pins and latch mechanism associated with them to assure proper ejection of the molds that the present invention is directed.

When another mold is to be made, the half 11 of the core box is advanced toward its closed position against the half 10. During this movement, the positioning pins are engaged and move the plate 30 and stripper pins to their starting position as shown in FIG. 1. Since the plate 30 carries the latch 35, the pin and slot connection will act as cam means to cause reengagement of the latch.

I claim:

1. A core box for making molds comprising separable halves providing a shaped cavity for the reception of material to be molded, stripper pins extending through a first half of the box to a position to contact a mold therein, means to move said half away from the other when a mold has been made, said first half being slidable on the stripper pins during such movement, and means to hold the stripper pins stationary during the initial part of said movement to cause separation of the mold from the first half of the core box, said stripper pins being mounted on a plate, and other pins on the plate extending through the first box half and engageable with the face of the other box half to properly locate the stripper pins as the halves are brought together, the means to hold the stripper pins being a latch extending between the stripper pin plate and the other box half, and cam means to release the latch only after substantial movement of the first box half.

2. The combination of claim 1 in which the first box half engages and moves the stripper pin plate after release of the latch.

(References on following page)

References Cited

UNITED STATES PATENTS

| | | | |
|---|---|---|---|
| 2,711,567 | 6/1955 | Knapp | 249—68 |
| 3,197,825 | 8/1965 | Hammond | 18—2 |
| 3,316,593 | 5/1967 | Neumann | 18—43 X |

FOREIGN PATENTS

| | | |
|---|---|---|
| 348,970 | 2/1922 | Germany. |
| 38/1,133 | 1963 | Japan. |

J. SPENCER OVERHOLSTER, *Primary Examiner.*

E. MAR, *Assistant Examiner.*